United States Patent
Cho et al.

(10) Patent No.: US 9,300,500 B2
(45) Date of Patent: Mar. 29, 2016

(54) ADAPTIVE EQUALIZER AND METHOD OF CONTROLLING THE SAME

(71) Applicants: Seongho Cho, Gwacheon-si (KR); Wangsoo Kim, Seoul (KR); Jinsung Youn, Seoul (KR); Wooyoung Choi, Seoul (KR); Hojung Kim, Suwon-si (KR); Moonseung Yang, Hwaseong-si (KR)

(72) Inventors: Seongho Cho, Gwacheon-si (KR); Wangsoo Kim, Seoul (KR); Jinsung Youn, Seoul (KR); Wooyoung Choi, Seoul (KR); Hojung Kim, Suwon-si (KR); Moonseung Yang, Hwaseong-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 0 days.

(21) Appl. No.: 14/496,499

(22) Filed: Sep. 25, 2014

(65) Prior Publication Data

US 2015/0085912 A1 Mar. 26, 2015

(30) Foreign Application Priority Data

Sep. 26, 2013 (KR) .................... 10-2013-0114707

(51) Int. Cl.
*H04L 25/03* (2006.01)
*H04W 52/02* (2009.01)
*H04L 7/033* (2006.01)

(52) U.S. Cl.
CPC ......... *H04L 25/03885* (2013.01); *H04L 7/0337* (2013.01); *H04W 52/0287* (2013.01)

(58) Field of Classification Search
CPC .......... H04L 25/03885; H04L 7/0337; H04W 52/0287
See application file for complete search history.

(56) References Cited

U.S. PATENT DOCUMENTS

| | | | |
|---|---|---|---|
| 7,158,568 B2* | 1/2007 | Park et al. ...................... | 375/233 |
| 7,590,175 B2* | 9/2009 | Leibowitz et al. ............. | 375/229 |
| 8,111,792 B2* | 2/2012 | Ou ................................. | 375/350 |
| 8,300,685 B2* | 10/2012 | Chen et al. ..................... | 375/233 |
| 8,428,115 B2* | 4/2013 | Zhang et al. ................... | 375/232 |
| 2002/0034222 A1* | 3/2002 | Buchwald et al. ............. | 375/232 |
| 2008/0075457 A1* | 3/2008 | Skoog et al. .................... | 398/9 |
| 2012/0201289 A1* | 8/2012 | Abdalla et al. ................. | 375/233 |

FOREIGN PATENT DOCUMENTS

| KR | 20000042567 A | 7/2000 |
|---|---|---|
| KR | 1020070077741 | 7/2007 |
| KR | 100985486 B1 | 10/2010 |

OTHER PUBLICATIONS

Cheng Li et al., "A Ring-Resonator-Based Silicon Photonics Transceiver with Bias-Based Wavelength Stabilization and Adaptive-Power-Sensitivity Receiver", Digest of Technical Papers, 2013, pp. 124-126, IEEE International Solid-State Circuits Conference.

Behnam Analui et al., "A 10-Gb/s Two-Dimensional Eye-Opening Monitor in 0.13-μm Standard CMOS", Dec. 2005, pp. 2689-2699, vol. 40, No. 12, IEEE Journal of Solid-State Circuits.

* cited by examiner

*Primary Examiner* — Ross Varndell
(74) *Attorney, Agent, or Firm* — Harness, Dickey & Pierce, P.L.C.

(57) ABSTRACT

Provided are an adaptive equalizer for adaptively controlling an equalization coefficient until two comparators outputs a same value, after generating a sensitivity difference between signals at a front end of each comparator for performing sampling, and a method of controlling the adaptive equalizer.

15 Claims, 11 Drawing Sheets

ADAPTIVE EQUALIZER AND METHOD OF CONTROLLING THE SAME

RELATED APPLICATION

This application claims the benefit of Korean Patent Application No. 10-2013-0114707, filed on Sep. 26, 2013, in the Korean Intellectual Property Office, the entire disclosure of which is incorporated herein in its entirety by reference.

BACKGROUND

1. Field

Example embodiments relate to an adaptive equalizer and/or a method of controlling the same.

2. Description of the Related Art

In the field of multimedia, in which large-capacity data transmission may be desired, there is a demand for high-speed transmission systems that allow high-speed data transmission.

In a process of high-speed data transmission, when a signal passes through a transmission channel such as a cable, a printed-circuit board (PCB), or an optical fiber, a data waveform may be affected by bandwidth limitations. If the bandwidth is limited, energy of a symbol may cause interference to nearby symbols due to inter-symbol interference (ISI), thus deteriorating communication performance. Further, if a transmission speed is increased and a symbol interval is reduced, such a problem may worsen. Therefore, bandwidth limitations may be a limiting factor in a transmission speed for high-speed data communication.

An equalizer may be utilized to compensate for the limited bandwidth. If an environment, such as channel characteristics, temperature, or power voltage changes, the equalizer may need be adjusted to provide optimum channel compensation.

SUMMARY

At least some example embodiments relate to an adaptive equalizer for adaptively controlling an equalization coefficient until two comparators outputs a same value, after generating a sensitivity difference between signals at a front end of each comparator for performing sampling, and a method of controlling the adaptive equalizer. However, example embodiments are not limited thereto, and other example embodiments may be inferred from the example embodiments described hereinafter.

Additional aspects will be set forth in part in the description which follows and, in part, will be apparent from the description, or may be learned by practice of the presented example embodiments.

According to some example embodiments, an adaptive equalizer includes an equalizing unit for equalizing an input signal, based on an equalization coefficient; a plurality of sampling units for generating a plurality of signals with different sensitivity from the equalized input signal, and sampling the plurality of signals with the different sensitivity; and an error detection unit for determining the equalization coefficient, by comparing the sampled signals to each other, wherein the equalizing unit equalizes the input signal based on the determined equalization coefficient until an error is not present between the sampled signals.

According to other example embodiments, a method of controlling an adaptive equalizer includes: equalizing an input signal, based on an equalization coefficient; generating a plurality of signals with different sensitivity from the equalized input signal, and sampling the plurality of signals with the different sensitivity; and determining the equalization coefficient, by comparing the sampled signals to each other, wherein the equalizing unit of the input signal includes equalizing the input signal based on the determined equalization coefficient until an error is not present between the sampled signals.

According to other example embodiments, a non-transitory computer-readable storage medium may have stored thereon a computer program, which when executed by a computer, performs the aforementioned method.

BRIEF DESCRIPTION OF THE DRAWINGS

These and/or other aspects will become apparent and more readily appreciated from the following description of the example embodiments, taken in conjunction with the accompanying drawings in which.

DETAILED DESCRIPTION

Figure 1:
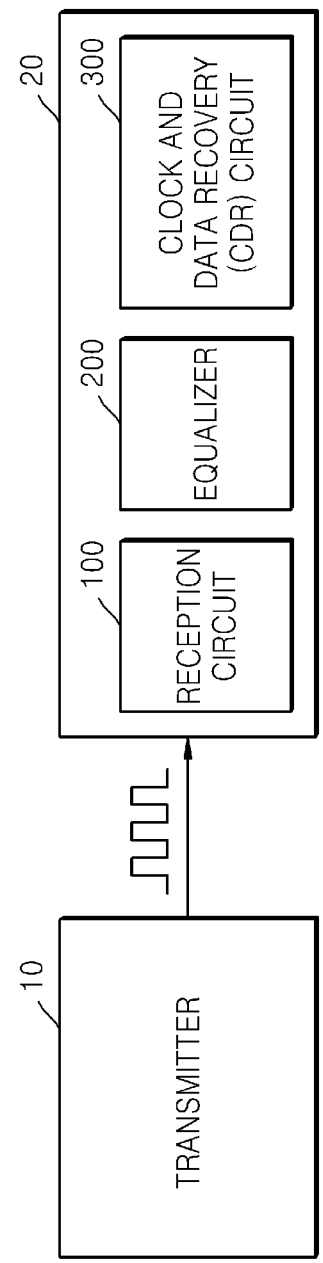
FIG. 1 is a block diagram of a data transmission system.

Reference will now be made in detail to example embodiments, some examples of which are illustrated in the accompanying drawings, wherein like reference numerals refer to like elements throughout. In this regard, the example embodiments may have different forms and should not be construed as being limited to the descriptions set forth herein. Accordingly, some of the example embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

It will be further understood that the terms "comprises," "comprising," "includes," and/or "including," when used herein, specify the presence of components or steps, but do not preclude the presence or addition of one or more other components, unless otherwise specified.

It will be understood that, although the terms first, second, third, etc., may be used herein to describe various elements, but these elements should not be limited by these terms. These terms are only used to distinguish one element from another element.

It will be understood that when an element is referred to as being "connected," or "coupled," to another element, it can be directly connected or coupled to the other element or intervening elements may be present. In contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Various example embodiments will now be described more fully with reference to the accompanying drawings in which some example embodiments are shown. In the drawings, the thicknesses of layers and regions are exaggerated for clarity.

Some example embodiments provide an adaptive equalizer and a method of controlling the same.

FIG. 1 is a block diagram of a data transmission system. It may be understood by one of ordinary skill in the art that, in addition to elements shown in FIG. 1, other elements may be further included.

Referring to FIG. 1, the data transmission system may include a transmitter 10 for transmitting data and a receiver 20 for receiving transmitted data. The transmitter 10 and the receiver 20 may be provided in a separate form or in a form such as a transceiver, in which a transmission function and a reception function are combined.

The transmitter 10 may transmit various types of signals for transmitting data. For example, if the transmitter 10 is a transmitter for optical transmission, the transmitter 10 may transmit data to the receiver 20 by using light flashing.

The receiver 20 may include a reception circuit 100, an equalizer 200, and a clock and data recovery (CDR) circuit 300.

The reception circuit 100 may receive a signal that is input from outside. The equalizer 200 may compensate for distortion in the signal that may be caused by a channel via which the signal is transmitted. The CDR circuit 300 may recover data from the equalized signal. Hereinafter, characteristics of the equalizer 200 according to some example embodiments are described.

Figure 2:
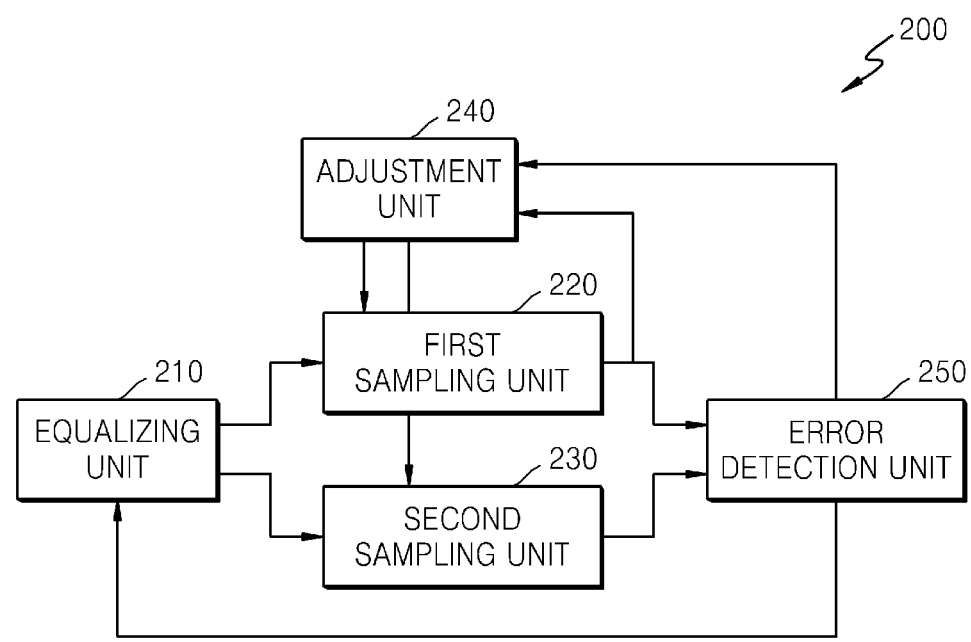
FIG. 2 is a block diagram illustrating an internal configuration of an adaptive equalizer according to some example embodiments.

FIG. 2 is a block diagram illustrating an internal configuration of an adaptive equalizer 200 according to some example embodiments. It may be understood by one of ordinary skill in the art that, in addition to elements shown in FIG. 2, other elements may be further included.

Referring to FIG. 2, the adaptive equalizer 200 may include an equalizing unit 210, a first sampling unit 220, a second sampling unit 230, an adjustment unit 240, and an error detection unit 250.

The equalizing unit 210 may equalize an input signal to generate an output signal, by using a gain of the input signal. The equalizing unit 210 may be formed of an equalizing filter that operates based on an equalization coefficient. A signal, input to the equalizer 200, may have been distorted as the signal passed through a transmission channel when the signal is transmitted by the transmitter 10.

The equalizing unit 210 may compensate for the distortion in the signal in consideration of characteristics of a transmission channel. The equalizing unit 210 may determine a degree of compensation for distortion according to the equalization coefficient. An operation of the equalizing unit 210 is described by referring to FIGS. 3A and 3B.

Figure 3A:
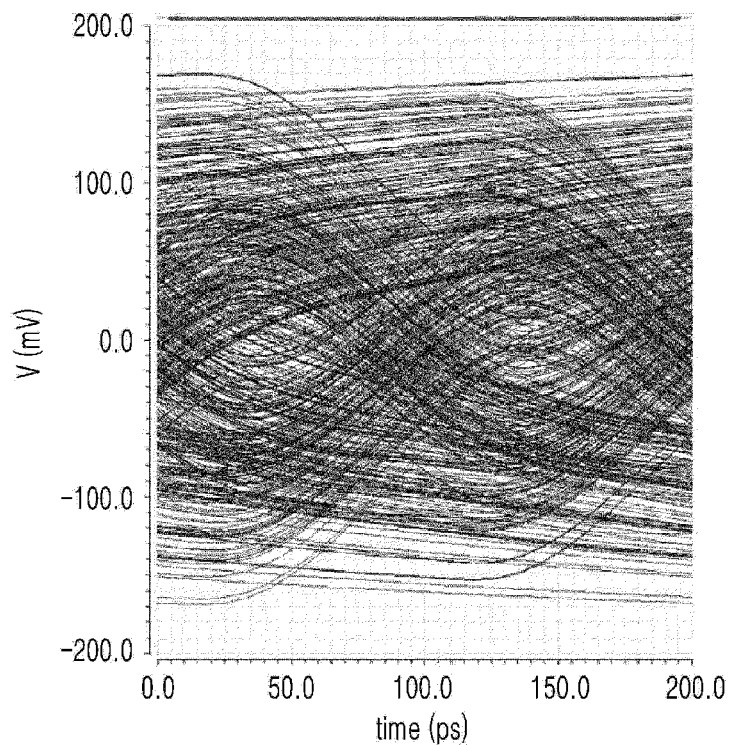
FIGS. 3A and 3B are eye diagrams illustrating input signals before and after equalization which is performed by an equalizing unit.
Figure 3B:
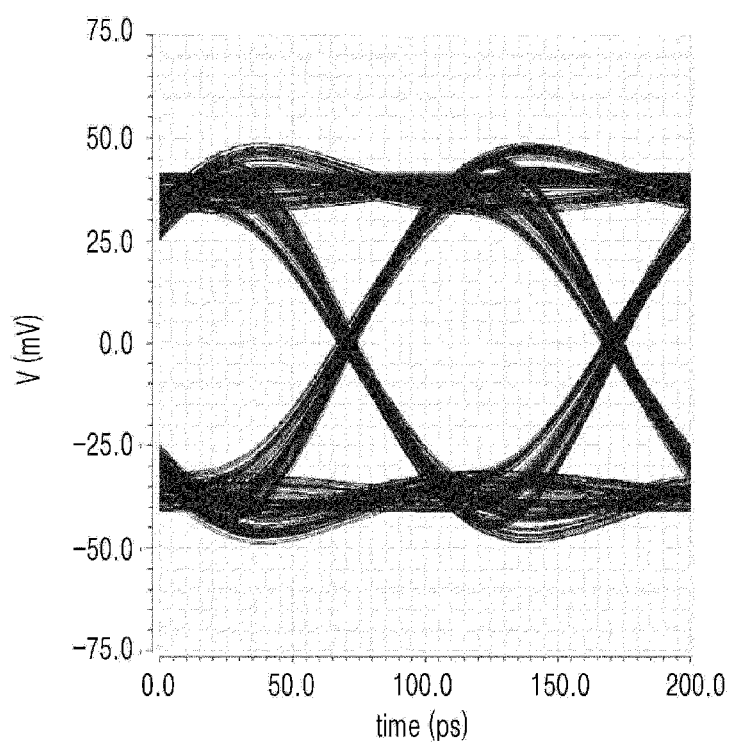

FIGS. 3A and 3B are eye diagrams illustrating input signals before and after equalization which is performed by the equalizing unit 210. An eye diagram refers to a diagram that is obtained by dividing an input signal into segments at unit intervals and representing the segments to overlap with each other.

FIG. 3A is an eye diagram of an input signal before equalization performed by the equalizing unit 210. The eye diagram that is shown in FIG. 3A may be generated by, when data that is transmitted by the transmitter 10 is affected by an transmission channel, inputting data of a signal in an attenuated form instead of a signal having a clear edge, dividing the input data of a signal at unit intervals, and representing the divided input data of a signal to overlap with each other.

In the case of a signal that is shown in such a diagram, it may be difficult to set a reference line for distinguishing between a logical zero and a logical one. Additionally, since a magnitude of a signal varies, it may be also difficult to determine a value of data that is received by the receiver 20.

The equalizing unit 210 may facilitate distinguishing data values from each other by compensating for distortion of a transmission channel through an equalization process.

FIG. 3B is an eye diagram of an input signal after equalization performed by the equalizing unit 210. With reference to 0 V, an upper part and a lower part are more clearly distinguished from each other, and thus, data having a logic level of zero and data having a logic level of one may be more clearly distinguished from each other. Therefore, in some example embodiments, the equalizing unit 210 may adjust a gain of an input signal, so as to easily determine a data value by sampling the input signal.

Figure 4:
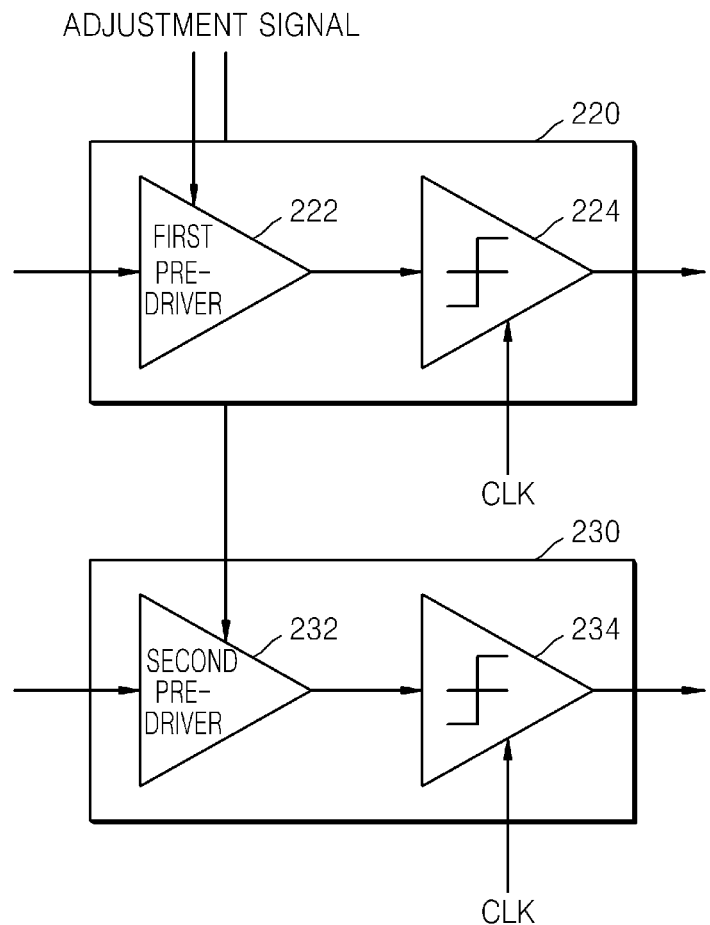
FIG. 4 is a block diagram illustrating internal configurations of a first sampling unit and a second sampling unit.

FIG. 4 is a block diagram illustrating internal configurations of the first sampling unit 220 and the second sampling unit 230. It may be understood by one of ordinary skill in the art that, in addition to elements shown in FIG. 4, other elements may be further included.

According to some example embodiments, the adaptive equalizer 200 may include a plurality of sampling units. FIG. 2 shows the adaptive equalizer 200 that includes two sampling units. However, a number of sampling units are not limited thereto.

The plurality of sampling units may generate a plurality of signals, having different sensitivities from each other, from an equalized input signal, and sample the plurality of signals having different sensitivities. In other words, the first sampling unit 220 may generate and sample a first signal, which is obtained by adjusting sensitivity to an input signal that is equalized by the equalizing unit 210. The second sampling unit 220 may generate and sample a second signal, which is obtained by adjusting sensitivity to an input signal that is equalized by the equalizing unit 210. The first sampling unit 220 and the second sampling unit 230 receive an input of the same signals from the equalizing unit 210. However, the signals are pre-processed at a front end of a comparator to have different sensitivity from each other.

As shown in FIG. 4, the first sampling unit 220 may include a first pre-driver 222 and a first comparator 224. The first pre-driver 222 may generate a signal, which is obtained by adjusting sensitivity to an input signal that is equalized by the equalization unit 210. The first pre-driver 222 may be implemented as a buffer such as a current mode logic (CML) amplifier. The first pre-driver 222 is located at a front end of the first comparator 224, and may pre-process a signal that is output to the first comparator 224. In detail, as a gain or a common mode voltage of the first pre-driver 222 is updated, sensitivity to a first signal, which is output to the first comparator 224, may become different. For example, by controlling a bias voltage of the buffer that constitutes the first pre-driver 222, a gain or a common mode voltage of the first pre-driver 222 may be adjusted.

The first comparator 224 may sample a first signal, to which sensitivity is adjusted, from the first pre-driver 222. Then, the first comparator 224 may compare the sampled first signal to a desired (or, alternatively, a predetermined) reference voltage, and thus, determine whether sampled data is 0 or 1 and output a value of 0 or 1. The first comparator 224 may perform sampling according to an input clock CLK.

The second sampling unit 230 may include a second pre-driver 232 and a second comparator 234. The second pre-driver 232 and the second comparator 234, included in the second sampling unit 230, operate in a same method as the first pre-driver 222 and first comparator 224 included in the first sampling unit 220. However, the first pre-driver 222, included in the first sampling unit 220, and the second pre-driver 232, included in the second sampling unit 230, receive an input of different adjustment signals, so as to generate signals having different sensitivities from the same signal that is input from the equalizing unit 210. The adjustment signal is transmitted from the adjustment unit 240. This will be described by referring to FIG. 5.

Figure 5:
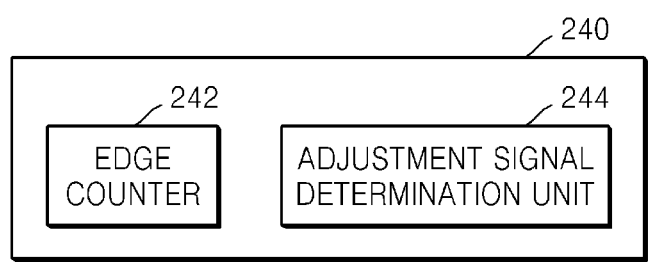
FIG. 5 is a block diagram illustrating an internal configuration of an adjustment unit.

FIG. 5 is a block diagram illustrating an internal configuration of the adjustment unit 240. It may be understood by one of ordinary skill in the art that, in addition to elements shown in FIG. 5, other elements may be further included.

Referring to FIG. 5, the adjustment unit 240 may include an edge counter 242 and an adjustment signal determination unit 244. The adjustment unit 240 may adjust sensitivity from an equalized input signal, by updating a gain or a common mode voltage of the pre-driver 222 or 232, based on a plurality of sampled signals.

The edge counter 242 may count a number of rising edges and falling edges, based on a value of 0 or 1 which is output from the first comparator 224 or the second comparator 234.

Until a desired (or, alternatively, a predetermined) level of error occurs between a plurality of sampled signals, the adjustment signal determination unit 244 may update a gain or a common mode voltage of the pre-driver 222 or 232 in consideration of a number of edges, which is counted by the edge counter 242. An adjustment signal, which is input to the pre-driver 222 or the second pre-driver 232, may be a value of a bias voltage of each pre-driver 222 or 232. Signals, which have respectively passed through the first pre-driver 222 and the second pre-driver 232 according to different values of bias voltages, may be signals that have different sensitivities from each other.

If the number of the counted edges corresponds a first desired (or, alternatively, a predetermined) number, the adjustment signal determination unit 224 may update a gain or a common mode voltage of the pre-driver 222 or 232. If a desired (or, alternatively, a predetermined) level of error occurs, the adjustment signal determination unit 224 may maintain a gain or a common mode voltage of the pre-driver 222 or 232.

Figure 6A:
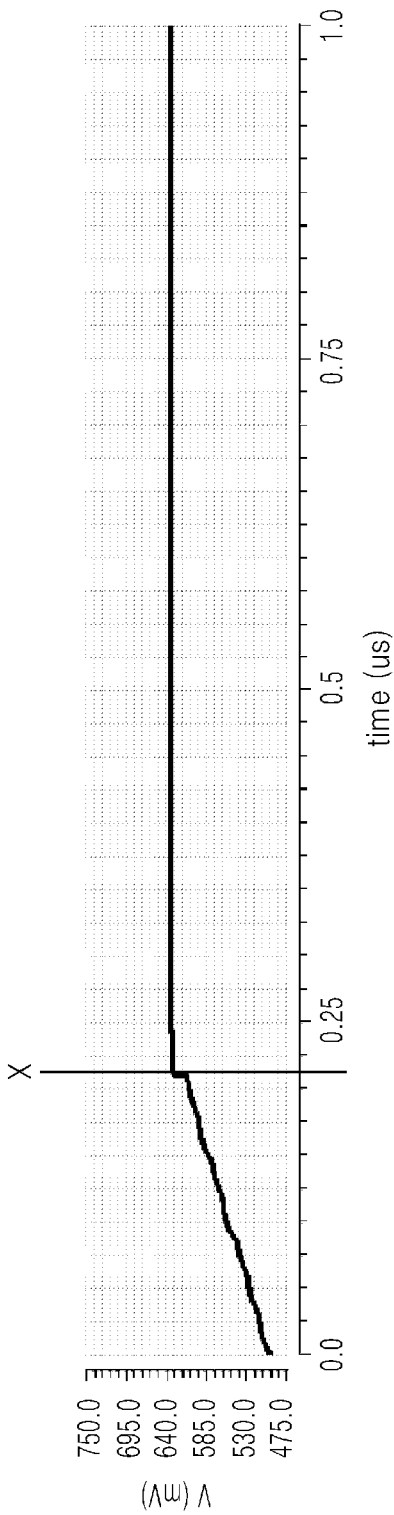
FIGS. 6A and 6B are diagrams for explaining a result of error detection according to an operation of the adjustment unit.
Figure 6B:
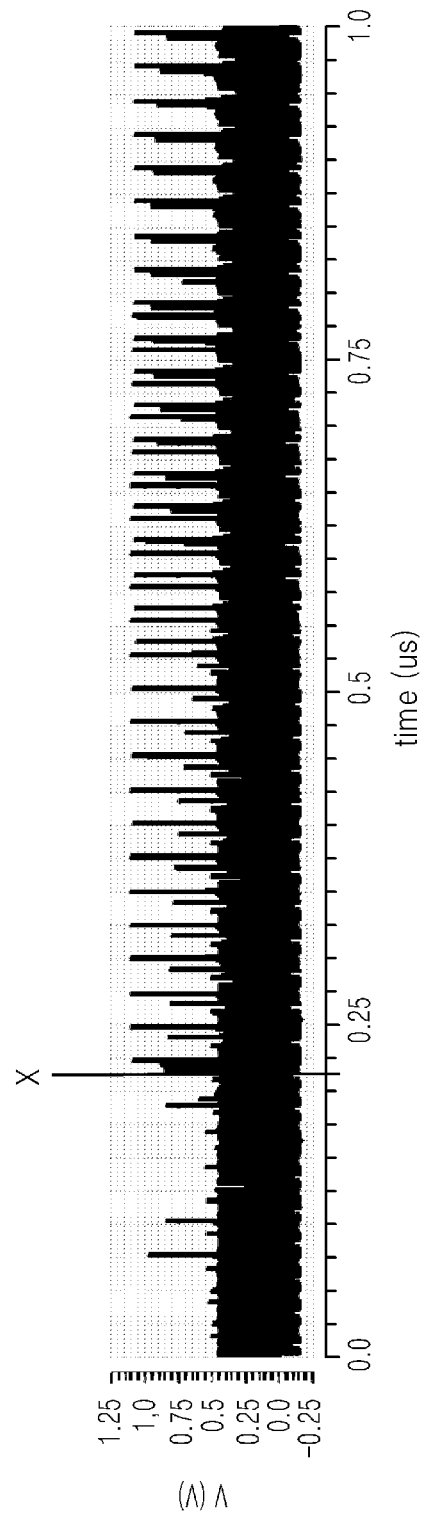

FIGS. 6A and 6B are diagrams for explaining a result of error detection according to an operation of the adjustment unit. FIG. 6A is a diagram illustrating an operation of the adjustment unit 240. FIG. 6B is a diagram illustrating a result of, if a plurality of sampled signals that are output from a plurality of sampling units are different from each other, determining an error and detecting the error.

Referring to FIG. 6A, a bias voltage, which is input to the pre-driver 222 or 232 by the adjustment unit 240, may rise to a point of time X, and then, may be constantly maintained from the point of time X. Referring to FIG. 6B, in the example illustrated, a sufficient level of error has not occurred between the plurality of sampled signals until the point of time X, and the sufficient level of error occurs from the point of time X at which the bias voltage is constantly maintained.

Figure 7:
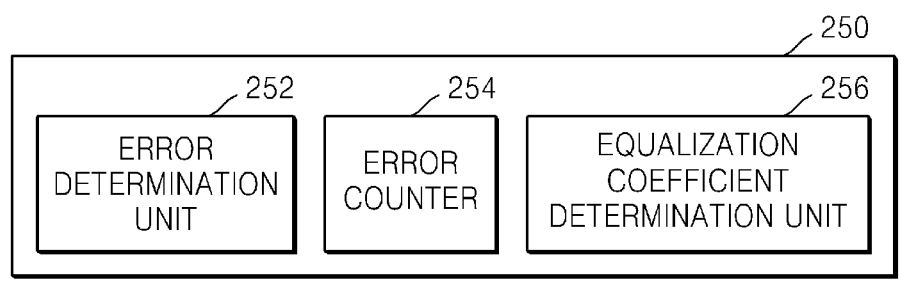
FIG. 7 is a block diagram illustrating an internal configuration of an error detection unit.

FIG. 7 is a block diagram illustrating an internal configuration of the error detection unit 250. It may be understood by one of ordinary skill in the art that, in addition to elements shown in FIG. 7, other elements may be further included.

The error detection unit 250 may include an error determination unit 252, an error counter 254, and an equalization coefficient determination unit 256.

If a plurality of sampled signals that are output from each comparator 224 or 234 in the plurality of sampling units are different from each other, the error determination unit 252 may determine an error. Since the comparator 224 or 234 outputs only a value of 0 or 1, the error determination unit 252 may be implemented using an exclusive or (XOR) gate. In other words, if output values of two comparators 224 and 234 are different from each other, the error determination unit 252 may determine an error, and thus may output a value of 1. Conversely, if output values of two comparators 224 and 234 are the same, the error determination unit 252 determines that an error has not occurred, and thus may output a value of 0.

The error counter 254 may count a number of errors that are determined by the error determination unit 252. For example, a number of errors may be counted by counting the number of 1 values output by the error determination unit 252, however, example embodiments are not limited thereto.

The equalization coefficient determination unit 256 may control an equalization coefficient of the equalization unit 210 in consideration of a number of counted errors. For example, if a number of errors that are counted by the error counter 254 corresponds to a second desired (or, alternatively, predetermined) number, the equalization coefficient determination unit 256 updates the equalization coefficient. If a number of errors are not counted, the equalization coefficient determination unit 256 maintains the equalization coefficient. As such, the equalization coefficient determination unit 256 may control an equalization coefficient of the equalizing unit 210.

The equalizing unit 210 equalizes an input signal based on an equalization coefficient that is determined by the equalization coefficient determination unit 256, until an error does not occur between signals that are sampled by a plurality of the sampling units.

Figure 8A:
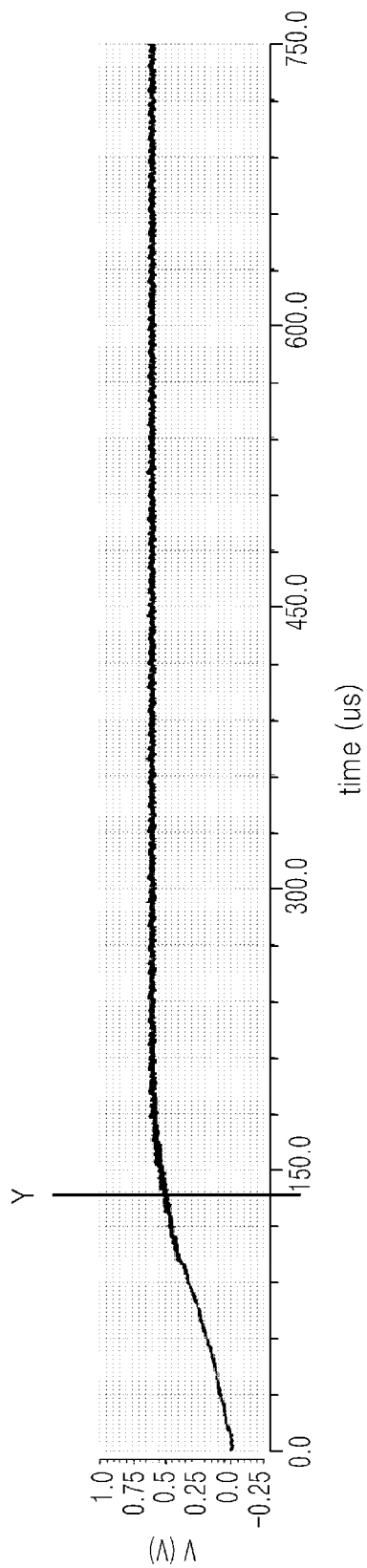
FIGS. 8A and 8B are diagrams for explaining a result of error detection according to an operation of the equalizing unit.
Figure 8B:
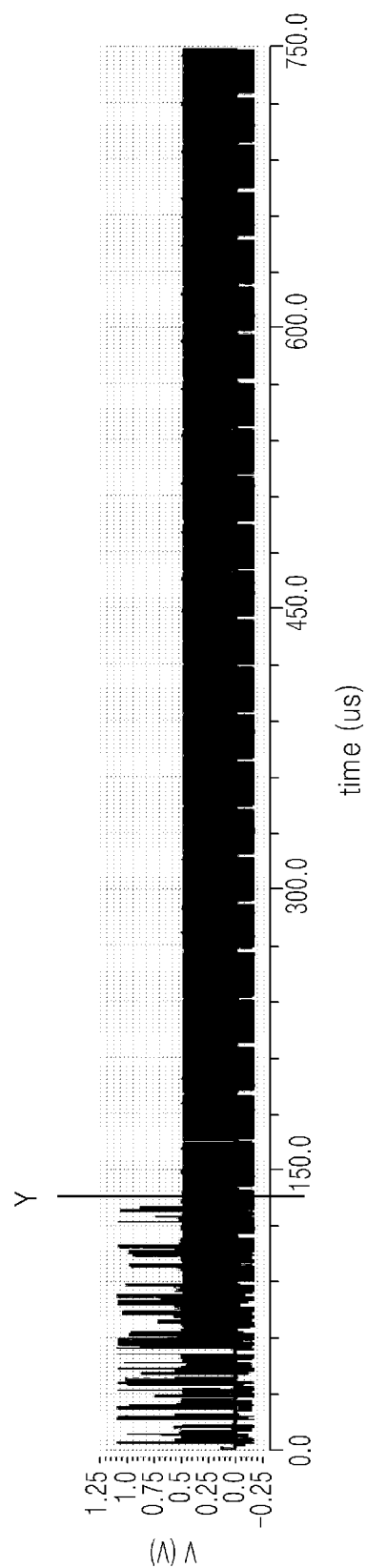

FIGS. 8A and 8B are diagrams for explaining a result of error detection according to an operation of the equalizing unit 210. FIG. 8A illustrates an operation of the equalizing unit 210. FIG. 8B illustrates a result of, if a plurality of sampled signals that are output from a plurality of sampling units are different from each other, determining an error and detecting the error.

Referring to FIG. 8A, the equalizing 210 executes equalization until a point of time Y by updating an equalization coefficient and adjusting a gain of an input signal. Then, an operation of the equalization is maintained from the point of time Y. Referring to FIG. 8B, an error has occurred between the plurality of sampled signals until the point of time Y, and an error disappears from the point of time Y at which the operation of equalization is constantly maintained by the equalizing unit 210. In other words, if an error is present, an equalization coefficient is updated, and equalization is adaptively executed according to the updated equalization coefficient by the equalizing unit 210. However, if an error is not present, an equalization coefficient may be maintained.

Figure 9:
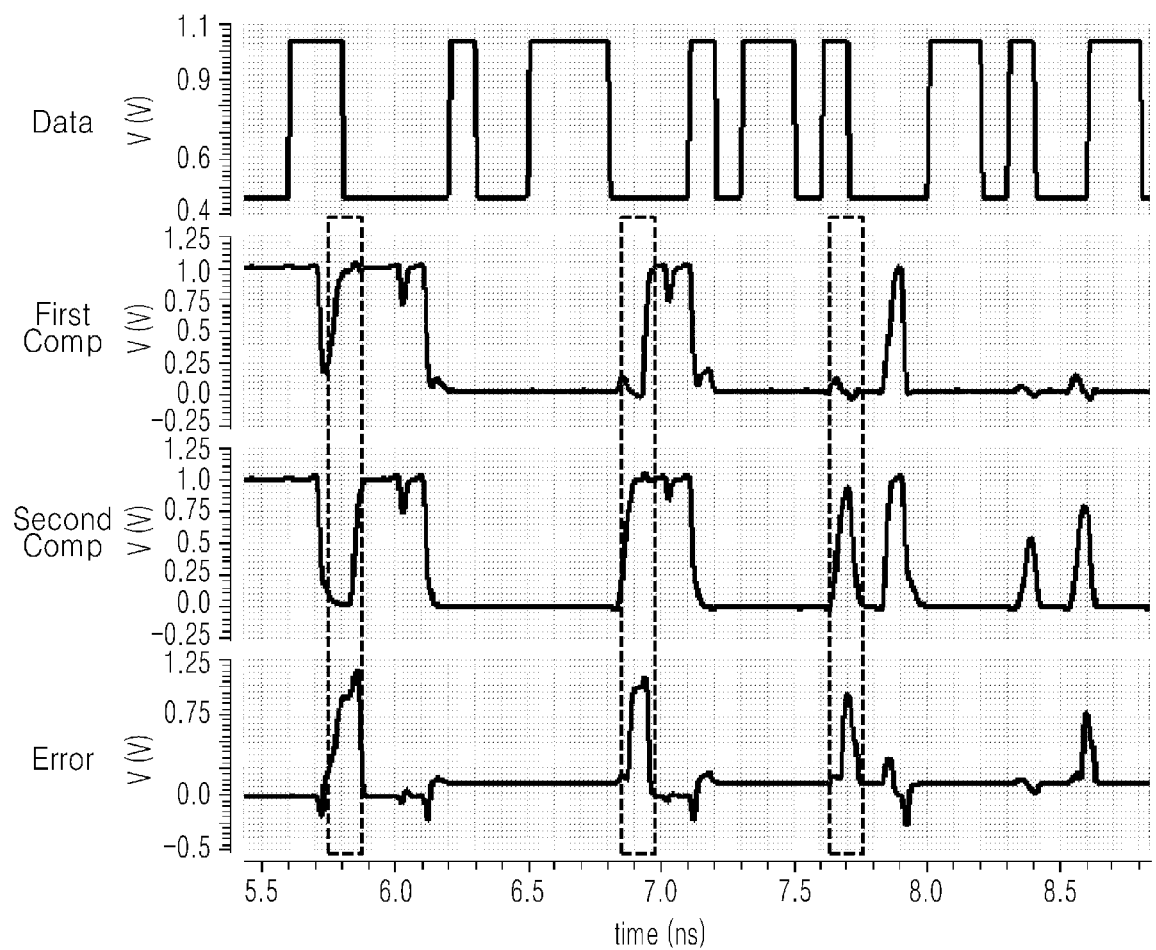
FIG. 9 is a diagram for explaining an output and an error of each comparator before equalization, performed by the adaptive equalizer, according to some example embodiments.

FIG. 9 is a diagram for explaining an output and an error of each of the first and second comparators 224 and 234 before equalization, which is performed by the adaptive equalizer 200, according to some example embodiments.

FIG. 9 shows original data (Data), which is transmitted by the transmitter 10, and outputs First Comp and Second Comp of each of the first and second comparators 224 and 234 and a detected error Error, which are shown by the receiver 20 before equalization.

The original data Data, transmitted by the transmitter 10, is digital data with a clear edge that is transmitted to the receiver 20. With regard to the outputs First Comp and Second Comp of each of the first and second comparators 224 and 234, the digital data is transmitted as a signal that may be attenuated and distorted due to an effect of a transmission channel.

Due to the distortion, an area in which a part of a signal of the original data Data may be missing, and, therefore, an area in which the output First Comp from a first comparator 224 may be different from the output Second Comp from the second comparator 234. For example, referring to dotted-line boxes shown in FIG. 9, the area, in which the output First Comp from a first comparator is different from the output Second Comp from the second comparator, and the area in which an error is present in a graph of Error, are on the same time axis.

Figure 10:
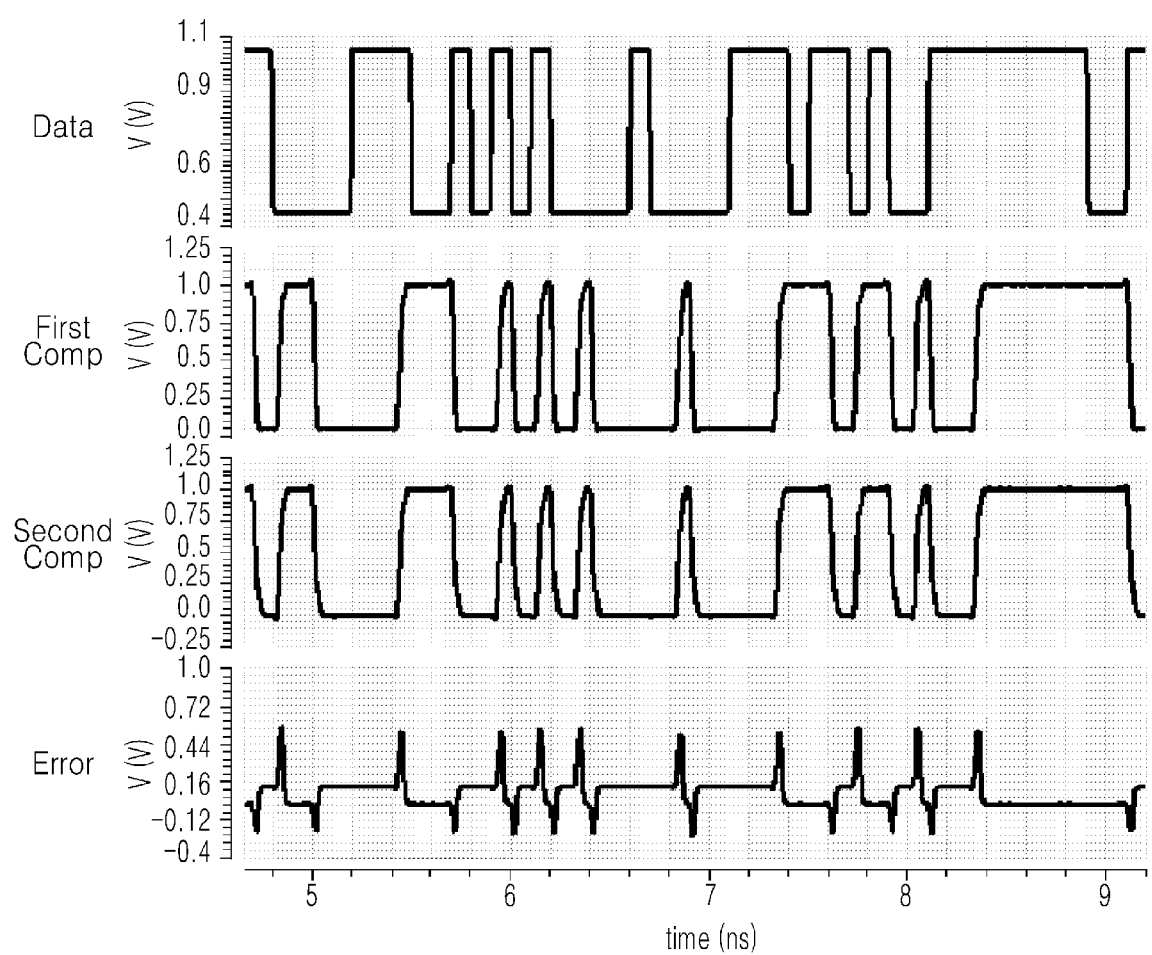
FIG. 10 is a diagram for explaining an output and an error of each comparator after equalization, performed by the adaptive equalizer, according to some example embodiments.

FIG. 10 is a diagram for explaining an output and an error of each of the first and second comparators 224 and 234 after equalization, which performed by the adaptive equalizer 200, according to some example embodiments.

FIG. 10 shows original data, which is transmitted by the transmitter 10, and outputs First Comp and Second Comp of each of the first and second comparators 224 and 234 and a detected error Error after equalization.

As illustrated in FIG. 10, the original data Data that is transmitted by the transmitter 10 may experience a delay by the comparators 224, 234, however, none of the original data signal Data is missing. As such, an area in which the output First Comp from the first comparator 224 is different from the output Second Comp from the second comparator 234 is rarely present. In a graph of an error, the error Error, which may be present in an area in which the output First Comp from the first comparator 224 is different from the output Second Comp from the second comparator 234, rarely occurs and only a minute signal such as a glitch is present.

Figure 11:
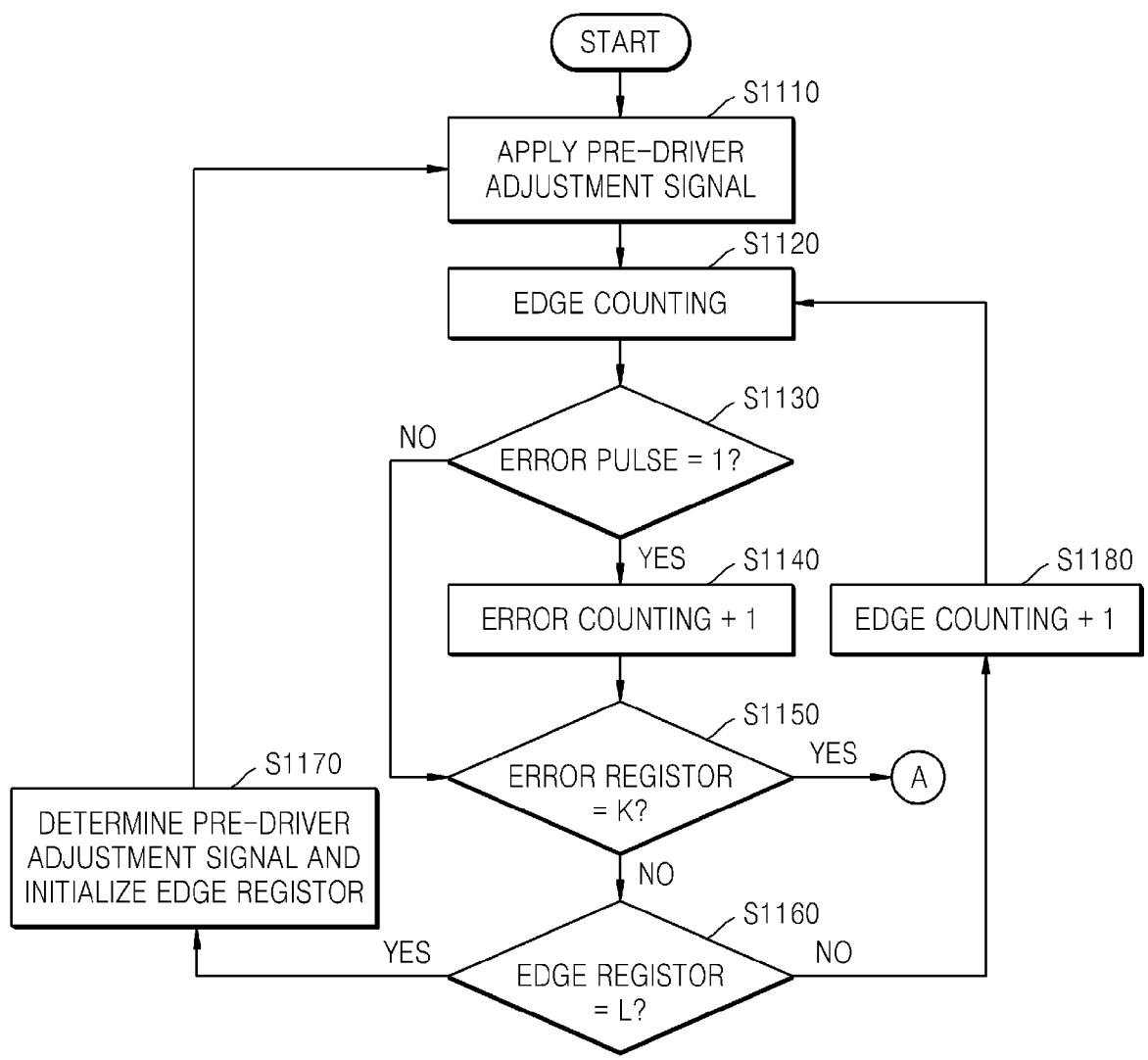
FIGS. 11 and 12 are flowcharts for illustrating a method of controlling the adaptive equalizer according to some example embodiments.
Figure 12:
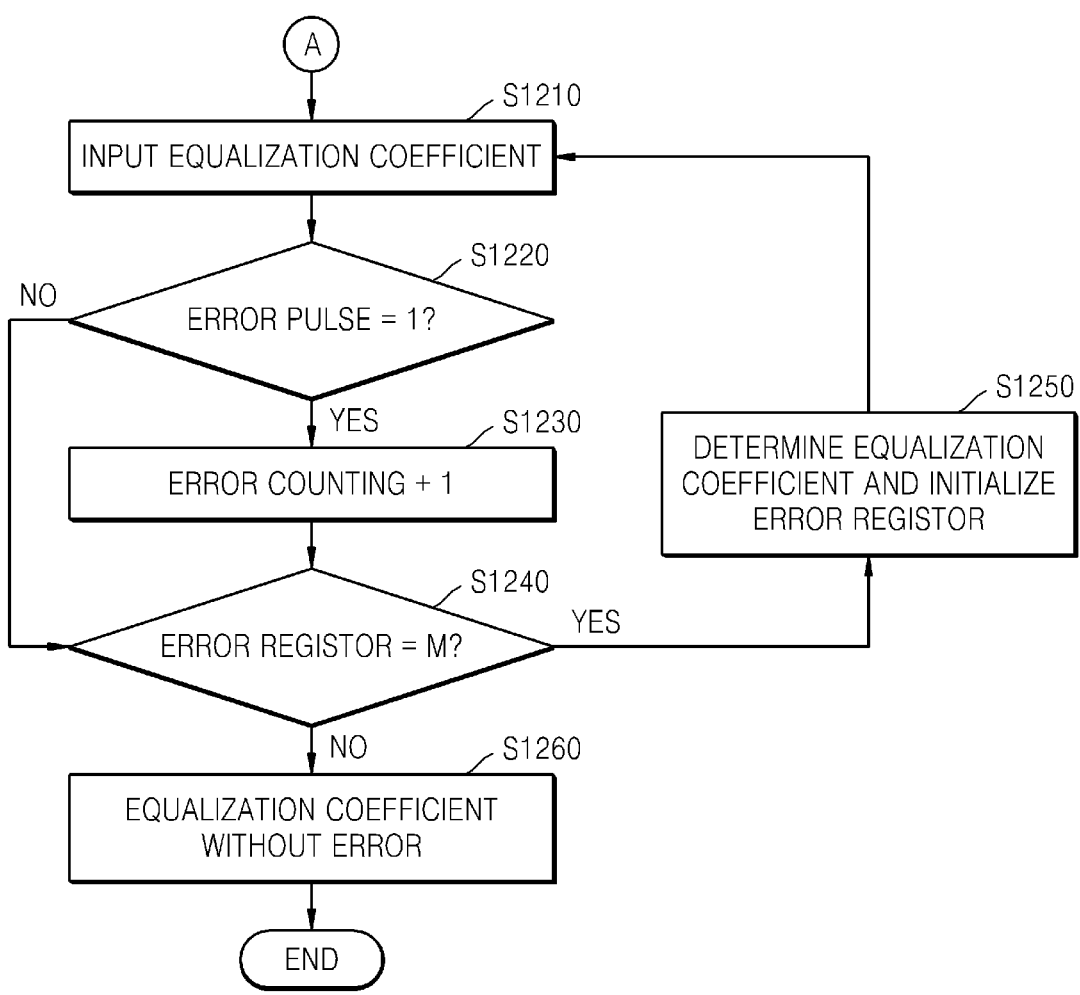

FIGS. 11 and 12 are flowcharts for illustrating a method of controlling the adaptive equalizer 200 according to some example embodiments. As discussed below, the description of the adaptive equalizer 200 discussed above may also be applied to a method of controlling the adaptive equalizer 200, and vice versa, even if detailed description is not repeated.

Referring to FIGS. 11 and 12, the receiver 20 may receive a signal that is transmitted by, for example, the transmitter 10 over a transmission channel. The received signal may have distortion therein caused by, for example, the transmission channel. The received signal may pass through an equalizer to compensate for the distortion. Hereinafter, a process of processing the signal by the adaptive equalizer 200 and a method of controlling the adaptive equalizer 200 according to some example embodiments are described.

When an input signal is received by the adaptive equalizer 200, the input signal passes through the equalizing unit 210. If the input signal is input to the equalizer 200 for a first time, an equalization coefficient may not yet be determined. Thus, the equalizing unit 210 may output a signal that is nearly in a same state as an input signal.

The equalized signal, which has passed through the equalizing unit 210, is input to a plurality of comparators for sampling, for example, the comparators included in the first sampling unit 220 and the second sampling unit 230. For example, the equalized signal may be input to the first pre-driver 222 and the second pre-driver 232. According to some example embodiments, the first sampling unit 220 and the second sampling unit 230 include the pre-driver 222 and the pre-driver 232, respectively, at a front end of each comparator, and thus generate a sensitivity difference between input signals that have passed through the equalizing unit 210.

In operation S1110, after the equalized signal is input to the pre-drivers 222, 232, the adjustment unit 240 may apply an adjustment signal to the first pre-driver 222 and the second pre-driver 232, to update a gain or a common mode voltage of each of the first pre-driver 222 and the second pre-driver 232. By updating the gain or the common mode voltage of each of the first pre-driver 222 and the second pre-driver 232, the adaptive equalizer 200 may determine a difference in sensitivity between the equalized input signals that are input to the first pre-driver 222 and the second pre-driver 232.

For example, an output from each of the first pre-driver 222 and the second pre-driver 232 may be input to the first comparator 224 and the second comparator 234. Based on the input to the comparators 224 and 234, the comparators 224 and 234 may output a value of 0 or 1 or may not output a value. If the sensitivity between the first and second pre drivers 22, 232 is great, the values of outputs from the first comparator 224 and the second comparator 234 may be different.

In operation S1120, the edge counter 242 may count, based on one of the values of outputs from the first comparator 224 and the second comparator 234, a number of rising edges or falling edges of the output from the comparator 224 and 234.

Further, if the values of the output of the first comparator 224 and the second comparator 234 are different from each other, the error determination unit 252 may generate an error pulse as shown in the Error graph in FIG. 9. In operations S1130 and s1140, if an error pulse is generated, the error counter 254 increases a number of errors counted, for example, by 1. If values of outputs from the first comparator 224 and the second comparator 234 are the same, the error determination unit 252 may not generate an error pulse. Therefore, if a sensitivity difference between input signals that are input to the first comparator 224 and the second comparator 234 is great, an error pulse is generated and error counting, stored in a register, is increased.

If the number of errors counted by the error counter 254 reaches a desired (or, alternatively, a predetermined) level K in operation S1150, operation A shown in FIG. 12 is performed, without having to further increase a sensitivity difference between input signals.

If the number of errors counted by the error counter 254 reaches a desired (or, alternatively, a predetermined) level K, in operation S1170, the error detection unit 250 may instruct the adjustment unit 240 to increase a sensitivity difference between input signals according to the number of the edges. If a value of the register that stores the value of counting the edges is not a first desired (or, alternatively, a predetermined) number L, in operation S1180, the edge counter 242 increases a number of the edges by one.

FIG. 12 shows a process in which, if a sensitivity difference between input signals that are input to the first comparator 224 and the second comparator 234 is sufficient, and thus an error at a certain level or higher is present between signals that are sampled by the first comparator 224 and the second comparator 234, an equalization coefficient is adaptively controlled so that an error does not occur between the sampled signals.

First, in operation S1210, an equalization coefficient is input to the equalizing unit 210. In operation S1220, based on the equalization coefficient, an input signal is equalized, and whether an error has occurred is determined by comparing output values of the first comparator 224 and the second comparator 234 with regard to the equalized input signal. In operation S1230, if output values of the first comparator 224 and the second comparator 234 are different from each other, errors are counted. If a number of the errors corresponds to a second desired (or, alternatively, predetermined) number M in operation S1240, it is determined that a value of the equalization coefficient is increased by 1, and the error register is initialized in operation S1250. Then, according to an updated equalization coefficient, the input signal is equalized again by the equalizing unit 210. If errors are not counted any more in operation S1260, the equalization coefficient is maintained.

According to some example embodiments, an adaptive equalizer and a method of controlling the same may be performed by generating a sensitivity difference by having different gains of pre-drivers at front ends of two comparators, and then, adaptively controlling an equalization coefficient of the adaptive equalizer until the two comparators output a same value. This may maintain a differential operation of a whole circuit. Thus, a burden of minimum sensitivity for the comparators at the time of sampling may be reduced to a half or less, compared to a conventional method, and a power noise may be overcome.

Additionally, by using a pre-driver, a signal gain may be increased and, at the same time, input referred noise may be reduced. Thus, a signal-to-ratio (SNR) may be increased.

Additionally, simply by using a comparator instead of using an analog-to-digital converter, information about a magnitude of an equalization signal may be digitalized. Accordingly, an adaptive algorithm using a digital circuit may be implemented by using a lower complexity and power consumption. compared to a structure in which an analog-to-digital converter is used, As described above, according to the one or more of the above example embodiments, a digital equalizer control circuit may be implemented by simply using a comparator and a controller instead of using an analog-to-digital converter. Thus, system complexity and power consumption may be reduced and an operation of the system may be improved.

The adaptive equalizer 200 may include a processor and a memory (not shown).

The processor may be an arithmetic logic unit, a digital signal processor, a microcomputer, a field programmable array, a programmable logic unit, a microprocessor or any other device capable of responding to and executing instructions in a defined manner such that the processor is programmed with instructions that configure the processor as a special purpose computer to perform the operations illustrated in FIGS. 11 and 12, such that the processor is configured to adaptively control an equalization coefficient of the adaptive equalizer 200 until comparators therein output a same value.

For example, the processor may be configured to execute instructions that program the processor to perform the functions of one or more of the adjustment unit 240 and the error detection unit 250.

In addition, other example embodiments can also be implemented through computer readable code/instructions in/on a medium, e.g., a computer readable medium, to control at least one processing element to implement any above described embodiment. The medium can correspond to any medium/media permitting the storage and/or transmission of the computer readable code.

The computer readable code can be recorded/transferred on a medium in a variety of ways, with examples of the medium including recording media, such as magnetic storage media (e.g., ROM, floppy disks, hard disks, etc.) and optical recording media (e.g., CD-ROMs, or DVDs), and transmission media such as Internet transmission media. Thus, the medium may be such a defined and measurable structure including or carrying a signal or information, such as a device carrying a bitstream according to one or more embodiments of the present disclosure. The media may also be a distributed network, so that the computer readable code is stored/transferred and executed in a distributed fashion. Furthermore, the processing element could include a processor or a computer processor, and processing elements may be distributed and/or included in a single device.

It should be understood that the example embodiments described therein should be considered in a descriptive sense only and not for purposes of limitation. Descriptions of features or aspects within each example embodiment should typically be considered as available for other similar features or aspects in other embodiments.

While one or more example embodiments have been described with reference to the figures, it will be understood by those of ordinary skill in the art that various changes in form and details may be made therein without departing from the spirit and scope of the present disclosure as defined by the following claims.

What is claimed is:

1. An adaptive equalizer comprising:
   an equalizing unit configured to equalize an input signal based on an equalization coefficient;
   a plurality of sampling units configured to, generate a plurality of adjusted signals from the equalized input signal, each of the plurality of sampling units having a sensitivity that varies independently, and the plurality of sampling units configured to sample a respective one of the plurality of adjusted signals; and
   an error detection unit configured to vary the equalization coefficient based on sampled signals until an error is not present between the sampled signals,
   wherein each of the plurality of sampling units includes,
      a pre-driver configured to generate an adjusted sensitivity signal by adjusting the sensitivity of a respective one of the plurality of sampling units to the equalized input signal, and
      a comparator configured to output a logic low or a logic high based on sampling the adjusted sensitivity signal.

2. The adaptive equalizer of claim 1, wherein the plurality of sampling units comprises:

a first sampling unit configured to generate a first signal by adjusting a sensitivity of the first sampling unit to the equalized input signal, and to sample the first signal; and a second sampling unit configured to generate a second signal by adjusting a sensitivity of the second sampling unit to the equalized input signal, and to sample the second signal.

3. The adaptive equalizer of claim 1, further comprising:

an adjustment unit configured to adjust the sensitivity of the respective one of the plurality of sampling units based on the plurality of sampled signals by updating a gain or a common mode voltage of the pre-driver.

4. The adaptive equalizer of claim 3, wherein the adjustment unit comprises:

an edge counter configured to count a number of edges associated with the sampled signals; and an adjustment signal determination unit configured to update the gain or the common mode voltage of the pre-driver based on the number of edges, until a threshold level of error is generated between the sampled signals.

5. The adaptive equalizer of claim 4, wherein, if the counted number of edges corresponds to a first number, the adjustment signal determination unit is configured to modify the gain or the common mode voltage of the pre-driver and, if the threshold level of error is generated, the adjustment signal determination unit is configured to maintain the gain or the common mode voltage of the pre-driver.

6. The adaptive equalizer of claim 1, wherein the error detection unit comprises:

an error determination unit configured to detect that the error is present if the sampled signals are different from each other;

an error counter configured to count a number of times that the error determination unit detects the error as a number of errors; and an equalization coefficient determination unit configured to control the equalization coefficient of the equalizing unit based on the number of errors.

7. The adaptive equalizer of claim 6, wherein, if the number of errors corresponds to a second number, the equalization coefficient determination unit is configured to update the equalization coefficient, and if the number of errors does not correspond to the second number, the equalization coefficient determination unit is configured to maintain the equalization coefficient.

8. A method of controlling an adaptive equalizer, the method comprising:

equalizing an input signal, based on an equalization coefficient;

generating a plurality of adjusted signals from the equalized input signal, the adjusted signals having different sensitivities to the equalized input signal, sampling the plurality of adjusted signals; and varying the equalization coefficient based on sampled signals until an error is not present between the sampled signals, wherein the generating each of the plurality of the adjusted signals includes generating, by a pre-driver, the adjusted sensitivity signal by adjusting the sensitivity of a respective one of a plurality of sampling units to the equalized input signal, and the sampling each of the plurality of the adjusted signals includes outputting a logic low or high based on sampling the adjusted sensitivity signal.

9. The method of claim 8, wherein the generating of the plurality of the adjusted signals comprises:

generating, by a first sampling unit, a first signal by adjusting a sensitivity of the first sampling unit to the equalized input signal; and generating, by a second sampling unit, a second signal by adjusting a sensitivity of the second sampling unit to the equalized input signal, wherein the sampling includes, sampling the first signal, and sampling the second signal.

10. The method of claim 8, further comprising:

adjusting the sensitivity of the respective one of the plurality of sampling units based on the sampled signals by updating a gain or a common mode voltage of the pre-driver.

11. The method of claim 10, wherein the adjusting the sensitivity comprises:

counting a number of edges associated with the sampled signals; and updating the gain or the common mode voltage of the pre-driver based on the number of edges, until a threshold level of error is generated between the plurality of sampled signals.

12. The method of claim 11, wherein, if the counted number of edges corresponds to a first number, the updating modifies the gain or the common mode voltage of the pre-driver and, if the threshold level of error is generated, the updating maintains the gain or the common mode voltage of the pre-driver.

13. The method of claim 8, wherein the varying of the equalization coefficient comprises:

detecting that the error is present, if the sampled signals are different from each other;

counting a number of times that the detecting detects the error as a number of errors; and controlling the equalization coefficient based on the number of errors.

14. The method of claim 13, wherein, if the number of errors corresponds to a second number, the controlling of the equalization coefficient includes updating the equalization number and, if the number of the errors does not correspond to the second number, the controlling of the equalization coefficient includes maintaining the equalization coefficient.

15. A non-transitory computer-readable storage medium having stored thereon a computer program, which when executed by a computer, performs the method of claim 8.

* * * * *